Feb. 14, 1961 W. G. GLENN 2,971,431
TURBIDIMETER
Filed July 29, 1959 4 Sheets-Sheet 1
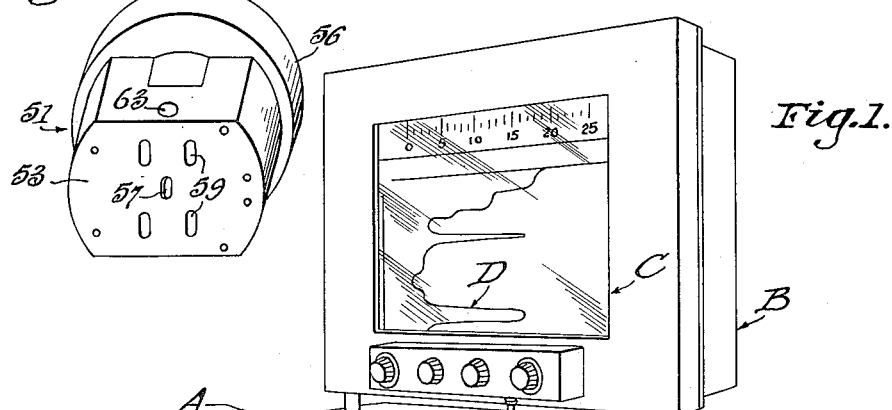
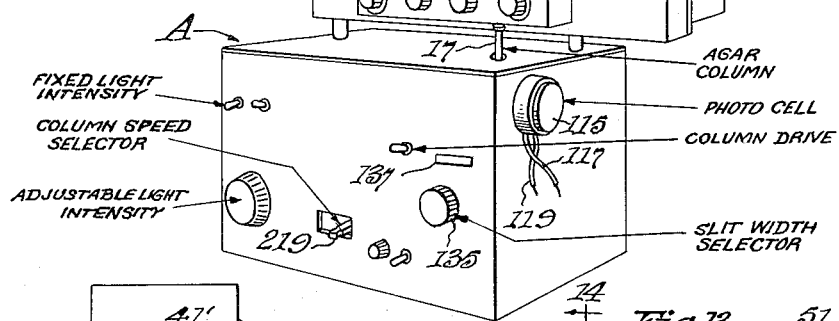
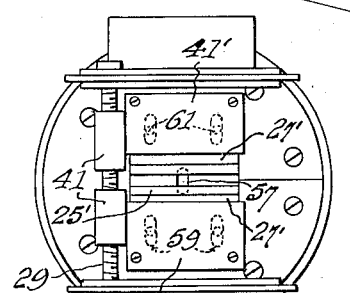
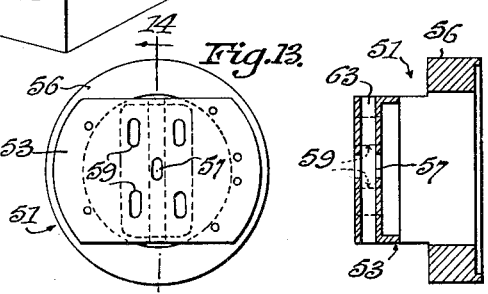
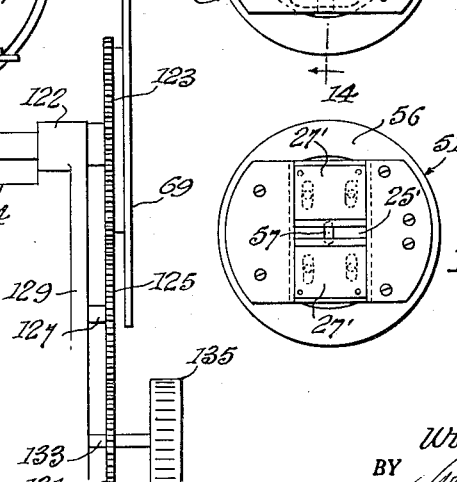
INVENTOR.
William G. Glenn
BY
ATTORNEYS Feb. 14, 1961  W. G. GLENN  2,971,431
TURBIDIMETER
Filed July 29, 1959  4 Sheets-Sheet 3
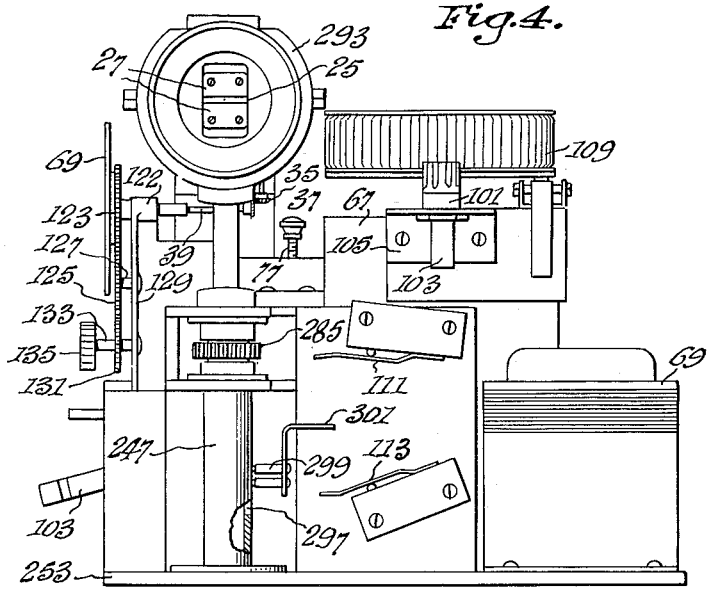
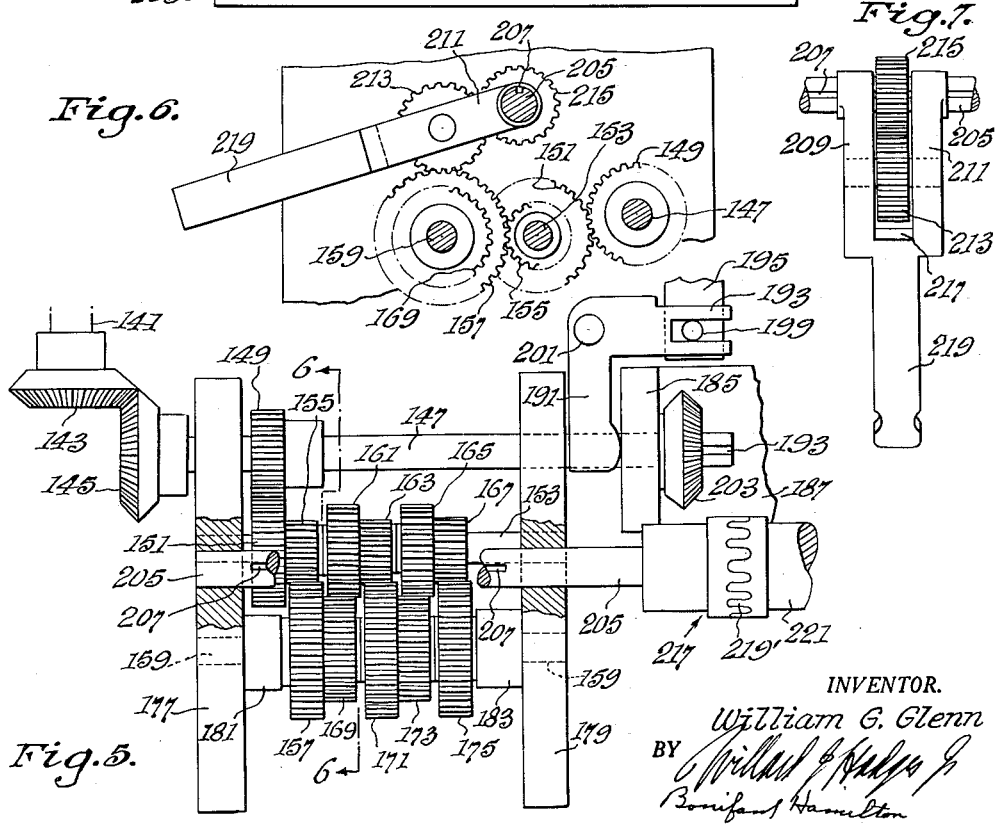
INVENTOR.
William G. Glenn
BY
ATTORNEYS

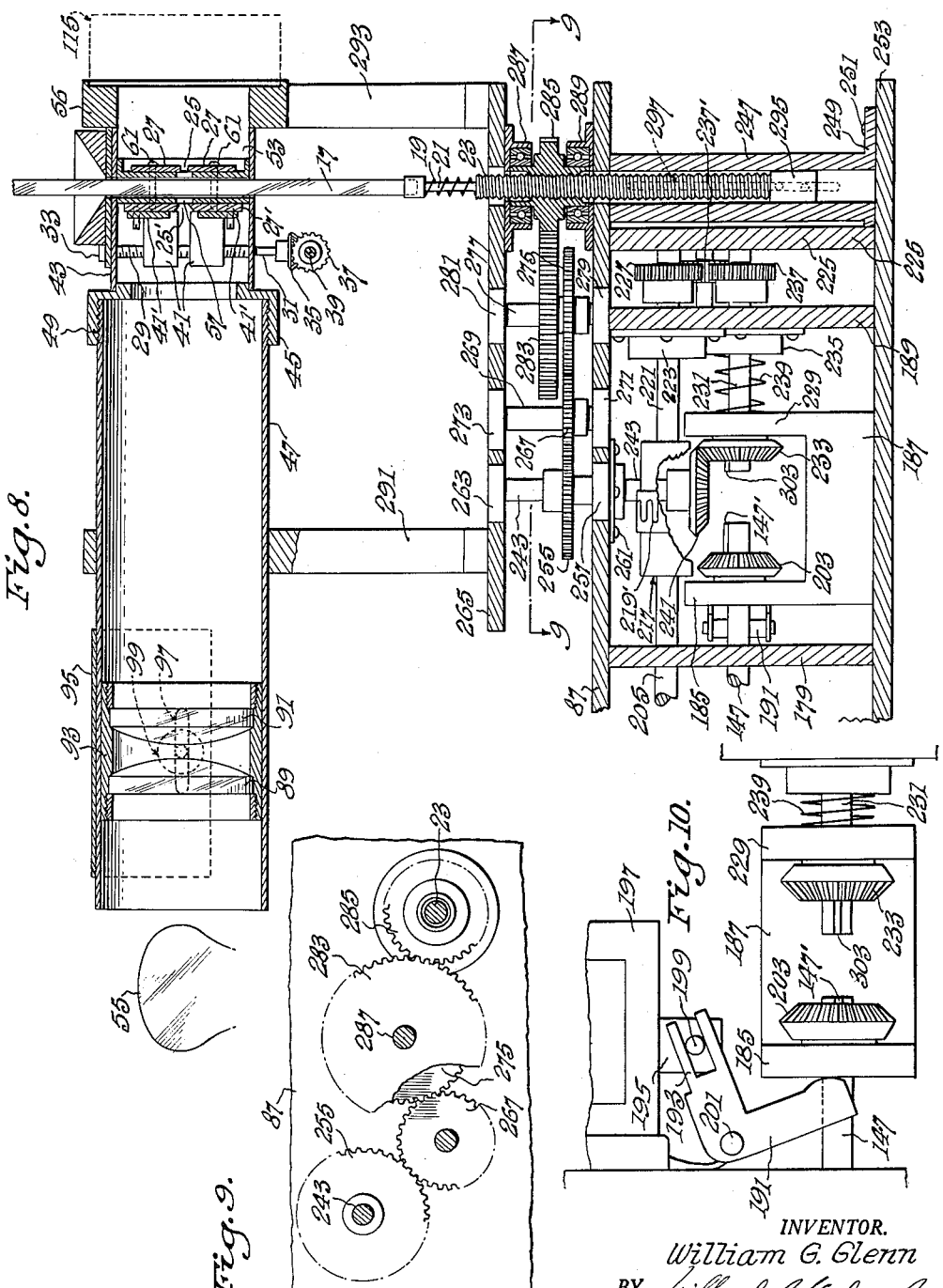

United States Patent Office 2,971,431
Patented Feb. 14, 1961

2,971,431

TURBIDIMETER

William G. Glenn, Box 284, School of Aviation Medicine, USAF, Brooks Air Force Base, San Antonio, Tex.

Filed July 29, 1959, Ser. No. 830,439

5 Claims. (Cl. 88—14)

(Granted under Title 35, U.S. Code (1952), sec. 266)

The invention described herein may be manufactured and used by or for the Government for governmental purposes without the payment of any royalty thereon.

The present invention relates to an improved apparatus for measuring the amount of suspended particles in a selected vehicle, that is, for measuring the turbidity of the vehicle medium, by means of which instrumentation turbidity determinations may be made quickly and expeditiously. More particularly, the present instrument has been designed for the rapid and accurate measurements of the turbidities or degrees of opalescence produced by particles suspended in water, or in other media, and it has been found to offer a new, accurate, and sensitive means for the rapid, quantitative measurement of such turbidities or degrees of opalescence. Still more particularly, the present instrument has been devised to measure quantitatively, accurately, and rapidly, the turbidities produced in columns of agar medium by antigen-antibody reactions in vitro.

In the past, various types of instruments have been devised and constructed for this general purpose. One of such, devised and constructed by Raymond L. Libby, of the Department of Zoology, Rutgers University, New Brunswick, New Jersey, is identified as the "Photronreflectometer" and has been described as to construction and operation by the said Raymond L. Libby in a publication appearing in The Journal of Immunology, vol. 34, pages 71 through 73 (1938), entitled "The Photronreflectometer—An Instrument for Measurement of Turbid Systems."

It may be noted here in this connection that in 1905, H. Bechhold (Structurbildung in Gallerten, Ztschr. phys. Chemie, 52: 185–199, 1905) studied the reaction between antigens and antibodies in gels, reactants whose property of forming a precipitate had been known since the work of Krauss in 1897. While working with goat serum and its antibodies, Bechhold observed the formation of ring structures in his tubes which resembled Liesegang rings, a phenomenon first observed in 1896 with mineral reactants. L. Reiner and H. Kopp, Kolloid Ztschr., 42: 335–338 (1927), "Ueber Entstehung von Liesegang'schen Ringen bei der serologischen Präzipitation," also described what they believed was Liesegang ring formation during specific precipitation.

Since 1932, specific precipitation in gelified media has been used for bacteriologic studies; R. H. Sia and S. F. Chung, Proc. Soc. Exper. Biol. & Med. 29: 792–795 (1932), "Use of antipneumococcus-serum-agar for the identification of pneumococcal types," used a technique for the identification of pneumococcus types in which an opaque ring developed around colonies grown on layers of agar containing the homologous antiserum. At almost the same time, G. F. Petrie and D. Steabben, Brit. M. J. 1: 377–379 (1943), "Specific identification of the chief pathogenic clostridia of gas gangrene" made more detailed observations when they attempted the transformation of "smooth" into "rough" bacterial types by culturing them on media containing antiserum. The specific halos which formed around meningococcus, pneumococcus and *Shigella dysenteriae Shiga* colonies often had a uniform appearance at the start, only to assume at a later stage the form of Liesegang rings; a similar type of precipitation was observed when solutions of the corresponding polysaccharides diffused into the same gel. B. G. Maegraith, Brit. J. Exper. Path. 14: 227–235 (1933), "Rough and smooth variants in stock cultures of meningococci"; M. B. Kirkbride and S. M. Cohen, Am. J. Hyg. 20: 444–453 (1934) "Precipitation reactions of meningococcus strains with immune serum in agar plates in relation to antigenic activity"; and G. F. Petrie and D. Steabben, Brit. M. J. 1: 377–379 (1934) "Specific identifcation of the chief pathogenic clostridia of gas gangrene," applied similar techniques to the study of meningococcus and to the identification of gas gangrene anaerobes. These investigations accomplished their immediate bacteriologic purpose, and the occasional observation of concentric rings was only an accessory result vaguely classified as the Liesegang phenomenon or mentioned without attempt at interpretation. The interpretation of concentric ring formation as the manifestations of several antigens was not considered.

The qualitative analysis of a naturally occurring mixture of antigens presents a problem whose resolution has always necessitated a combination of physicochemical methods, such as salting out, with the methods of immunochemistry and antibody absorption. Fractionation has proved necessary, since the classic immunochemical methods for titration of a given antigen or antibody may be most successfully applied under conditions where only a single antigen-antibody reaction obtains.

However, molecules (particularly protein molecules) endowed with the same immunologic specificity are generally better characterized by this specificity than are molecules having the same solubility in a given solvent or any other common physical property. Moreover, the immunologic specificity of proteins is related to their precise biologic origin. It therefore should be possible to effect the analysis of naturally occurring mixtures of antigens without recourse to physical methods.

One of the major problems encountered in the quantitation of antigen-antibody reactions in vertical agar columns is to obtain objective readings of zone densities and diffusion. In order to reduce the degree of subjective variation in the obseravtions, only thoroughly experienced technicians could be used. To avoid this limitation and inherent errors, the present applicant devised an attachment for the above-referred to Libby Photronreflectometer.

This adjunct, referred to in the art as Serum Agar Measuring Aid ("SAMA") effectively eliminates subjective variables, provides reliable valid data, and enables density and diffusion measurements to be made accurately by untrained technicians. The construction and operation of this adjunct to the Libby Photronreflectometer is described by the present applicant, William G. Glenn, in The Journal of Immunology, vol. 77 (No. 3) September 1956, pages 189–192, "Serum Agar Measuring Aid (SAMA)."

The determination by serum agar techniques of the minimum number of antigen-antibody systems in a precipitin reaction has become very useful in serology and immunology for protein analysis. For the most part, previous studies with agar columns have been limited to manual diffusion measurements or to subjective estimations of the number of zones and their relative densities. There also has been developed an indirect method of measuring diffusion and zone densities by photographing agar columns and then scanning the plates with a densitometer. (See J. Oudin, "Methods in Medical Research," vol. V, The Year Book Publishers, Inc., New York, 1952).

The above-referred to description of the Serum Agar Measuring Aid (SAMA) enables direct quantitation of agar column reactions by photometry. This Serum Agar Measuring Aid (SAMA) is a hand-operated accessory, and converting and graphing the SAMA density and diffusion measurements require about 60–75 minutes per column.

For better and rapid quantitation there has been devised and used a new system of instrumentation, identified as the Serum Agar Measuring Integrator (SAMI), as structurally and operationally described by William G. Glenn and Anna C. Garner in The Journal of Immunology, vol. 78, pages 395–400 (No. 6, June 1957). With the "SAMI" instrumentation, it is possible to scan and plot an agar column in 5–30 seconds, accurately and automatically.

The automatic scanning instrumentation has been applied, for example, to the study of zonal characteristics and to the quantitative measurement of several diffusion bands obtained with a precipitating system, the reactants being human serum or plasma fractions and rabbit antisera prepared against human serum. As set forth in the above-identified publication, the Serum Agar Measuring Integrator (SAMI) combines a Photronreflectometer, a Serum Agar Measuring Aid (SAMA), an electric motor, and a "Model R" Spinco Analytrol, produced by Spinco Division, Beckman Instrument Co., Berkeley, California, each of these units being modified structurally as described on pages 397 and 398 of the above-identified publication.

The foregoing basic instruments have been improved further by that of the instant invention, by increased sensitivity, flexibility, and portability. The instant instrumentation may be identified as the "Serum Agar Scanner Instrumentation" (SASI), and it is constructionally illustrated in the accompanying drawings, in which—

Fig. 1 is a perspective view of the present apparatus enclosed for convenience and portability in a cabinet provided with a vertically disposed reading screen;

Fig. 4 is an end elevation of the general assembly of the apparatus of the present invention looking in the direction of the arrow $a$ in Fig. 2;

Fig. 5 is a plan view of speed-changing gearing incorporated in the construction of the present invention;

Fig. 6 is a transverse sectional view taken on the line 6—6 of Fig. 5, looking in the direction of the arrows;

Fig. 7 is a plan view of a gear shift lever used with the speed-change gearing of Fig. 5;

Fig. 8 is a vertical section of a light tube and light opening-adjustment mechanisms, the view also illustrating a drive gear train, and nut and screw means for vertically moving the container for receiving the test liquid;

Fig. 9 is a horizontal sectional view taken on the line 9—9 of Fig. 8, looking in the direction of the arrows;

Fig. 10 is a detailed top plan view of the gear carriage and carriage shift bell-crank lever for effecting vertical movements of the container for receiving the test liquid;

Fig. 11 is a perspective view of a shutter-carrying unit used in connection with the forward end of the light tube illustrated in Fig. 8;

Fig. 12 is an end elevation of the shutter-carrying unit of Fig. 11, the view also showing the shutters together with their nut and screw mechanism and manual operating mechanism for adjusting the light opening;

Fig. 13 is an end elevation of the shutter-carrying unit;

Fig. 14 is a vertical sectional view taken on the line 14—14 of Fig. 13; and

Fig. 15 is an end elevation of the shutter-carrying unit and shutter guide mounted thereon.

Figure 2:
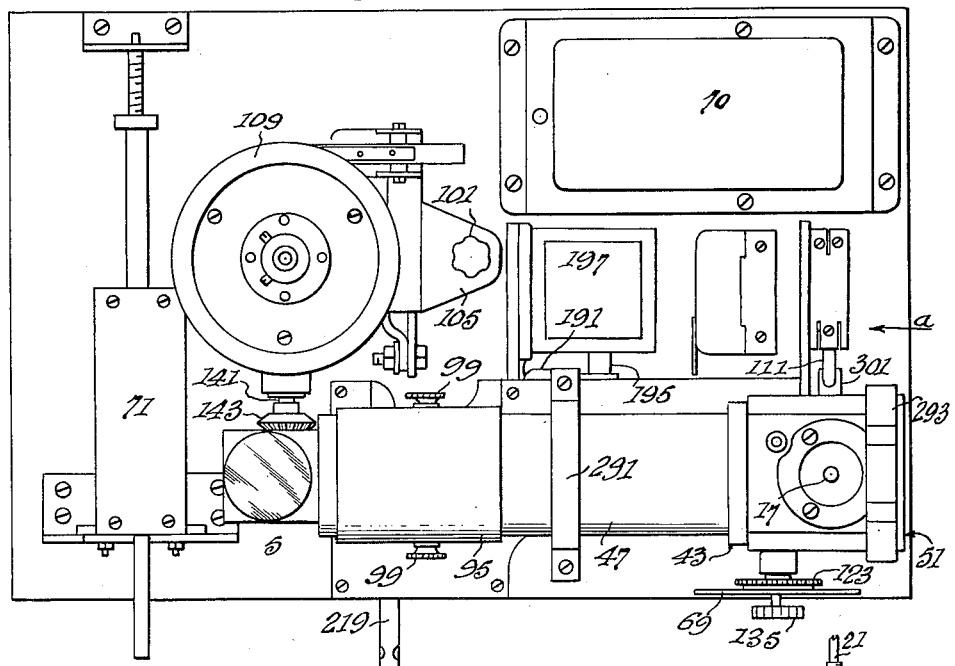
Fig. 2 is a top plan view of the serum agar scanner ininstrumentation of the present invention, the encasing cabinet being removed.

Before specific reference is made to the structural details of the present invention, it may be pointed out in general that the Serum Agar Scanner Instrumentation (SASI), shown in the drawings and particularly in perspective by Fig. 1, combines a specially constructed agar column scanner with a one-fourth second fast-response recorder. When an agar colum (4 mm. outside diameter and 80 mm. in length) is placed in the instrument, a beam of white light 1.1 mm. wide and of desired height (0 to 1.5 mm.) is passed through the column. This area should not contain precipitin zones. The photocell response to transmittance of this material is balanced (null point) with the recorder by adjustment of the suppressor ($\pm 100$ mv.). The entire instrumentation then is standardized by glass neutral density filters of known transmittance inserted between the chassis and the photocell of the scanner. A span adjustment suitable for the systems to be scanned also is set at this time. Following inactivation of the recorder, the column is moved rapidly downward by an electric drive and stops automatically at the bottom. After one of the three upward column rates has been selected, the column drive and the recorder are both activated. Differences in the densities and positions of the precipitin zones in the column change the photocell output, and this analogue voltage is reflected in the pattern produced by the recorder. These diffusion profiles of precipitin systems can be used to identify reactants and distinguish between human sera.

As has been indicated above, three column drive rates are available. Slow rates are compatible with agar columns in which the precipitin zones are close together. A reduced speed permits more time for the photocell and the recording servomechanism to respond to the changing zone densities. The span adjustment, sensitivity, and damping circuit in the recorder are set at optimum; a multispeed chart movement in eight increments (1 to 16 cm./min.) allows the diffusion profiles to be spread out as desired. Depending on the column-chart rate ratio, the average scanning time for reactions involving human serum is approximately fifteen seconds.

The basic principles of the scanner mechanism include an adjustable resistance that infinitely varies three fixed light intensities, facilitates balancing of the Serum Agar Scanner Instrumentation (SASI) with various light slit widths. Since the light beam is narrow and collimated, the translucent diffusion hemisphere minimizes photocell fatigue.

With a column-chart rate of ¼, 25 scannings of the same 5 zones in an agar column showed an average standard deviation of $\pm 0.022$ optical density (O.D.) units ($P<0.01$). Ten scannings of the same reaction in 10 different columns showed an average standard deviation of $\pm 0.040$ O.D. ($P<0.01$). These confidence limits apply to all density levels.

Under conditions similar to those above, diffusion measurements had an average standard deviation of $\pm 0.28$ mm. ($P<0.01$ and $\pm 0.61$ mm. ($P<0.01$). This deviation was reduced appreciably when the deflection of the recorder at the junction of the antigen-antiserum agar interface was discrete. A sharp transmittance difference between the antigen and the other reactants was advantageous in this respect.

Data on the diffusion and density phenomena of precipitin systems are particularly important for following immunochemical technics for fractionations of biologic materials, and for investigating differences between substances that participate in precipitin reactions.

Detailed reference now may be had to the drawings which have been described briefly and generally above. The mechanism referred to generally in the foregoing explanation may be housed suitably in a cabinet or the like, indicated at A on Fig. 1, through which extended the respective actuating instrumentalities, controls, switches, and the like, for the operating mechanism contained in the housing cabinet A. The housing cabinet A has associated with it a viewing screen B provided with control instrumentalities in plotting recorder C, as will be pointed out in greater detail hereinafter.

As has been indicated above, the instrument of the present invention is adapted to show on the viewing screen B a chart or graph D which is produced responsively to passage of light through a medium of differing or graduated turbidity, the graph D indicating degrees of turbidity in a medium containing natural or imparted turbidity of either uniform or zonal characteristics. The instrument of the invention therefore may be considered to be a form of turbidimeter, although, specifically, it has been designed as an instrument for indicating the quantitative turbidity of zones in agar precipitin columns, and accordingly the specific description of the instrument of this invention will be directed to such embodiment of utility.

In order to perform its functions, the apparatus is required to scan a vertically moving specimen tube, throughout the height of the specimen, which is contained in an elongated, vertically mounted tubular specimen holder 17, the turbidity of the specimen of whatever character it may be, is to be measured quantitatively. This tube 17 is mounted resiliently on a spring 19 and is provided for vertical movement by securing a lower restricted end portion 21 in a screw member 23 which is mounted, as will be pointed out hereinafter, so as to raise and lower the tube 17 in a selected direction. The mechanism for actuating the tube 17 will be described in detail hereinafter.

The specimen in tube 17 to be scanned is passed by rectangular light slits 25, 25' the widths of which are adjustable vertically by similar top and bottom shutter blades 27, 27' which are adjustable vertically by an elongated screw 29 on a shaft 31, the upper end of the screw 29 is secured for rotation as by a collar 33, the lower end of screw-carrying shaft 31 having mounted on its lower end a beveled pinion 35 intermeshing with a beveled gear 37 carried on an inner end of a manually operated shaft 39. The elongated screw 29 passes through oppositely internally threaded nuts 41 with which plates 41' are integral for carrying shutter blades 27, 27' so that rotation of gear 37 clockwise or counterclockwise selectively correspondingly rotates pinion 35 to separate or to close blades 27, 27' for correspondingly controlling the width of the slit apertures 25, 25'.

The shutter blades 27, 27' which control the width of the light-transmitting slits 25, 25', together with the adjusting screw 29 and the shutter blade operating nuts 41, are enclosed in a housing 43 through which the specimen tube 17 passes. This housing is mounted on a threaded flanged collar 45 over the light-outlet end of a light-transmitting tube 47, the threaded mounting of collar 45 on the exterior of tube 47 being indicated at 49. This flanged collar 45 frictionally receives the housing 43.

The slit-adjusting shutters 27, 27' are mounted on a shutter mounting unit 51 which is shown by Figs. 11 through 15 on the drawings. This unit 51 is an integral shutter mounting having a restricted insert portion 53 and an enlarged flange collar 56, the insert portion 53 having the central light passage slit 57 therethrough and slots 59 symmetrically disposed around the central slit 57, the slots 59 being adapted to receive screws 61 for attaching the shutters 27, 27', the vertically elongated shape of these slots 59 enabling the shutters 27, 27' to be adjusted vertically with respect to the light-transmitting silt 57 for selectively adjusting the light-transmitting capacity of the slit by selective adjustment of the shutters 27, 27' in slots 59.

Vertical movement of the specimen tube 17 is effected by a novel arrangement of transmission gearing which will be described in detail hereinafter. In practice, the specimen tube 17 is scanned throughout successive portions of the specimen contained therein at a selected one of three speeds. That is to say, the specimen tube 17 may be moved vertically at any one of three selected speeds, it being understood that the movement of the tube 17 is accomplished by actuation of a motor 67 as will be described hereinafter, the selected width of adjustment of the slits 25, 25' being indicated by a scale 69.

The light emitted from the lamp 55 is of substantially constant intensity, for assurance of which there are provided in circuit with the lamp 55 voltage stabilizing means 70 and an adjustable resistance 71. The lamp 55 is maintained in alignment with the optical axis of the tube 15 by adjusting mechanism including vertically adjustable socket means 73 mounted on a vertically adjustable bracket arm 75, which is adjusted by means of an adjusting screw 77 which operates in an internally threaded block 79 which is welded or secured otherwise to the lower end portions of the adjusting bracket 75. The screw 77 normally is urged upwardly by action of a coil spring 81 compressed about screw 77 between block 79 and the top bracket arm 83 of a second bracket 85 through which the screw 77 passes. Bracket 85 is mounted on top panel 87 of a housing for the specimen tube actuating mechanism to be referred to hereinafter.

Figure 3:
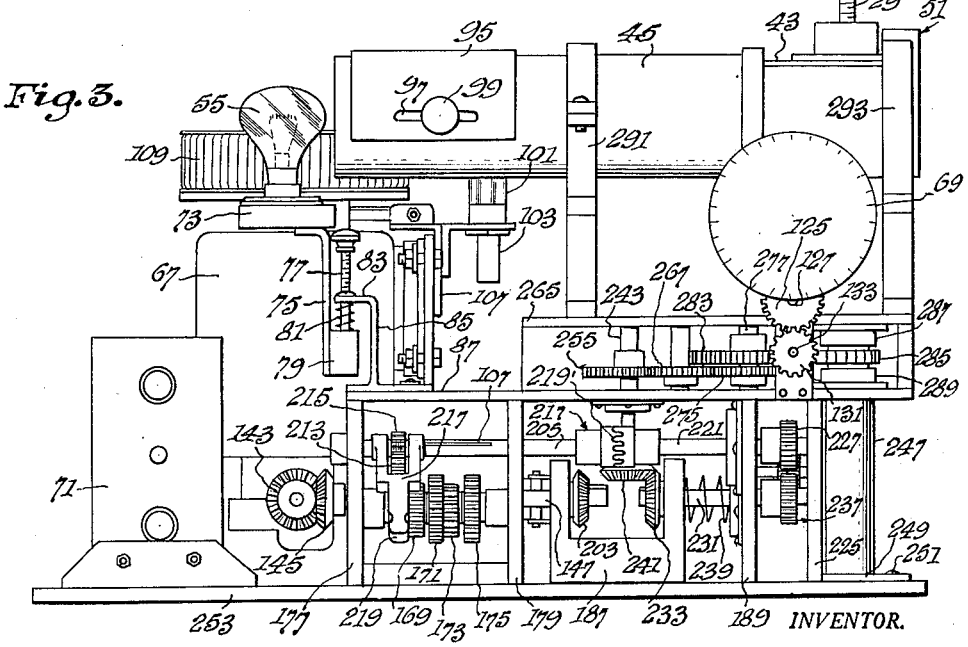
Fig. 3 is a front elevation of the general assembly shown in Fig. 1, the enclosing cabinet being removed.

Mounted within the light-transmitting tube 45 and adjacent to the lamp bulb 55 are a pair of oppositely disposed plano-convex lenses 89, 91, which are of equal size and convexity, these lenses 89, 91 being disposed with their convex surfaces in adjacent opposition, as is shown in Fig. 8, the lenses being mounted on a liner 93 that is connected with an external adjusting hood 95 which is mounted on the tube 47 for limited movement therealong, as determined by length of opposite slots 97 in which are positioned knurled set screws 99, sliding adjustment being effected by suitable manual adjustment. A control fuse assembly represented by elements 101 and 103 is mounted on angle member 105 and controls the entire system. This angle member 105 (Fig. 3) is shown as being mounted on a complemental angle member 107 which forms a part of a mounting assembly that also is mounted on the aforesaid top panel 87. Overheating of the tube 45 and the lenses 89, 91, together with bulb 55 may be prevented by provision of a squirrel-cage type fan 109. Upper and lower limit switches 111, 113 are provided for controlling the extent of movement of the specimen tube 17, through which tube light passes continuously from the light source 55 through slits 25, 25' as the tube 17 moves. The thus-transmitted light, which varies in intensity with the turbidity of the zones in the specimen in tube 17, passes to a photoelectric cell 115, the output from which passes through leads 117, 119 to a conventionally commercial plotting or recording instrument C which in practice is suitably a ¼-second fast recorder instrument.

The amount of scanning light employed for scanning the successive portions of the specimen contained in the columnar tube 17 depends upon the turbidity of the zones of the specimen being scanned. The width of the scaning slits 25, 25' is adjustable vertically by the amount of separation of similar vertically adjustable shutters 27, 27' which are actuated by the screw 29. As has been mentioned previously, this screw 29 is mounted on its lower end on the shaft 31 provided on its lower end with the beveled gear 35 which meshes the beveled gear 37 on the inner end of the shaft 39. This shaft 39 is mounted in bearings 121 and 122 (see Fig. 12) at the top of bearing plate 124 and terminates in gear 123 which is the largest gear of a train of three gears of downwardly graduated sizes as is shown in Fig. 12. The gear 123 mounts dial 69, the scale on which indicates the width of the light-transmitting slits, the gear 123 being the largest of a train of gears having a gear ratio suitable for desired adjustments of the width of the slits.

The top and largest gear of this gear train is this gear 123 which meshes with an intermediate gear 125 which is carried by a stub shaft 127 mounted in lateral bearing rib 129 of plate 124. The intermediate gear 125 meshes with the bottom and smallest gear 131 of this slit-controlling gear train, this last-mentioned gear 131 being also mounted in the lateral bearing rib 129 by stub shaft 133. This gear train is operated by manual manipulation of slit-width selector knob 135 which extends through the front panel of instrument box or cabinet A. The scale on dial 69 which indicates the width of the slit is visible through a window 137 in the front panel of the cabinet A.

As has been mentioned above, vertical movement of the specimen tube 17 is effected by a novel arrangement of a system of transmission gearing, the specimen tube 17 being scanned throughout successive portions of the specimen contained therein at a selected one of three speeds, the reversing motor 67 actuating a novel arrangement of transmission gearing in conjunction with a solenoid 139 by means of which reversing clutch mechanism for the tube 17 may be actuated.

The transmission gearing is mounted in a transmission housing mounted in the cabinet A, of which housing the aforesaid panel 87 is a top part. The transmission gearing is driven by motor 67 which may have a speed of 1800 r.p.m. which is geared down until motor shaft 141 and terminal bevel gear 143 thereon rotate at approximately 100 r.p.m. Beveled gear 143 on the motor shaft is meshed with beveled gear 145 on shaft 147, which carries a series of gears which are proportioned in size to assure the movement of the specimen column at desired selected speed. The shaft 147 carries gear 149 which meshes with gear 151 on shaft 153 and which has smaller gear 155 integral therewith. This smaller gear 155 meshes with a still larger gear 157 mounted on a third shaft 159.

The shaft 153 carries, in addition to the double gear 151, 155, two additional double gears 161, 163, and 165, 167, the gear 163 being smaller than gear 161 and integral therewith, and gear 167 being smaller than gear 165 and integral therewith. Of these, the larger gear 161 of double gear 161, 163 meshes with smaller gear 169 of double gear 157, 169, smaller gear 163 of the aforesaid double gear 161, 163 meshes with larger gear 171 of double gear 171, 173, this latter smaller gear 173 meshing with larger gear 165 of the double gear 165, 167, this last smaller gear meshing with a large single gear 175. All of these gears are driven from the gear 149 on shaft 147, and all are rotatable with respect to shafts 153 and 159 but independently of these shafts and of each other. Shafts 153 and 159 are relatively short shafts, the latter being mounted in successive upright elements 177 and 179 of the transmission housing and mounting frame, of which the top panel 87 defines a top part on which is mounted portions of drive mechanism for operating the specimen column, as will be explained in greater detail hereinafter. Shaft 159 is provided with bearings 181, 183 adjacent to the upright elements 177 and 179, while the ends of shaft 153 are received directly in these uprights. Driving shaft 147 extends through the left-hand arm 185 of a slidable clutch yoke 187 which is slidably mounted between uprights 179 and 189 of the transmission housing and frame, this yoke being reciprocably slidable through action of a bell crank lever arm 191 which is mounted on shaft 147 intermediate the transmission frame upright 179 and yoke arm 185 and has a bifurcated end 193 that is actuated by solenoid plunger 195 of solenoid 197, such plunger having an actuating pin 199 thereon which operates on the bifurcated end 193 of the shaft 147, the lever arm 191 being pivoted on pivots 201 in the transmission housing. The end of shaft 147 extends through the clutch yoke arm 185 and has a beveled clutch gear 203 thereon, the shaft 147 having a keyway 147' in which gear 203 slides responsively to movement of the clutch yoke 187.

Another shaft, indicated at 205, is mounted in the transmission housing and extends from the housing upright 177 into the clutch mechanism. This shaft 205 is the upper drive shaft and has an elongated keyway 207 therein for sliding accommodation of a power transmission yoke including spaced parallel arms 209, 211, between which are mounted gears 213, 215. These arms 209, 211, being joined by web 217 and actuated by manual lever arm 219, define a substantially U-shaped transmission yoke. The gear 213, being mounted between the arms 209 and 211, is adapted to mesh with the successive gears on the shaft 159 as the lever 219 is moved relative thereto, and as these gears vary in their ratios, gear 213 which meshes with a second gear 215 in the transmission yoke, rotates this latter at a speed commensurate with the speed of rotation of the gear 213, which in turn is dependent upon the size of the gear on the shaft 159 with which the gear 213 is intermeshing. The gear 215, being keyed to the upward drive shaft 205 and being driven by gear 213, drives the shaft 205 at corresponding speed.

The inner end of this upper drive shaft 205 carries releasable coupling instrumentalities as an assembly 217, including a releasable coupling 219' which has complementary interfitting coupling elements which releasably couple the shaft 205 with a similar shaft 221 which extends through transmission frame upright 189 by way of a bearing 223 with its end mounted in and terminating in transmission frame upright 225, there being a spur gear 227 secured to shaft 221 intermediate the transmission frame uprights 189 and 225.

Clutch yoke 187 has a second arm 229 which extends upwardly parallel to the aforementioned arm 185, this second arm 229 having a shaft 231 extending therethrough, the shaft 231 being complemental to shaft 147 and terminating in a bevel drive gear 223. This shaft 231 parallels shaft 221 and extends through frame upright 189 by way of bearing 235 and terminates in frame upright 225. The shaft 231 has mounted thereon a spur gear 237 intermediate the frame uprights 189 and 225, this spur gear 237 intermeshing through idler gear 237' with spur gear 227 on shaft 221.

The clutch yoke 187 is reciprocally slidable, there being provided, however, a compressed coil spring 239 which is compressed between yoke arm 229 and bearing 235 and encircles shaft 231 so as normally to urge the clutch yoke 187 towards the left in Fig. 8 and to maintain the beveled gear 233 in meshing engagement with a top bevelled gear 241 which is mounted on the lower end of shaft 243, the gear 241 being intermediate the aforesaid beveled drive gears 203 and 233, and is positioned in the clutch yoke 187, the shaft 243 which carries this gear 241 being a vertically extending shaft that forms an element of the actuating mechanism for the specimen tube 17.

It has been mentioned previously that the specimen tube 17 is mounted on a threaded mounting element 23 which forms an actuating screw for the specimen tube 17 and which is received in an internally threaded gear 285 and guide block 295 positioned in guide sleeve means 247 at the outer end of the transmission frame adjacent to the upright 225. The guide sleeve 247 has a bottom flange 249 which is secured, as is indicated at 251, by a screw or rivet to the base plate 253 of the transmission frame. It will be understood that the frame uprights 177, 179, 189, and 225 are secured suitably to this base plate 253 and that the top plate 87 of this transmission frame is secured firmly in any suitable manner to these uprights, thereby producing a rigid frame for mounting the aforesaid power transmission mechanism.

It has been noted that the vertical shaft 243 on the lower end of which is mounted the intermediate bevel clutch gear 241, is an element of the actuating mechanism for producing the scanning movements of the specimen tube 17, and that the said bevel clutch gear 241 is normally engaged by bevel clutch gear 233 on shaft 231 because of displacement of clutch yoke 187 through pressure of compressed spring 239 acting on the clutch yoke. The vertical shaft 243 has mounted thereon an initial gear 255 of a gear train composed of a series of gears which intermesh and are of graduated sizes for producing gear ratios enabling elevation of the specimen tube 17 at any one of three selected speeds. The shaft 243 is mounted in suitable bearing means 257 provided with flange 259 which is secured as is indicated at 261 to the top plate 87 of the transmission frame. The shaft 243 terminates at its upper end in bearing 263 mounted in a plate 265 which serves as a bearing plate and which is spaced above the top plate 87 of the transmission frame.

The gear 255 on shaft 243 meshes with and actuates a substantially smaller intermediate gear 267 which is carried on a shaft 269, the lower end of which shaft is mounted in a bearing 271. The upper end of shaft 269 is mounted in bearing 273 in the plate 265.

The small transmission gear 267 intermeshes with a larger gear 275 on shaft 277, the lower end of which is mounted in a bearing 279 in top plate 87, the upper end of the shaft 277 being mounted in bearing 281 in the plate 265. Also mounted on the shaft 277 and spaced above gear 275 is an enlarged gear 283, which intermeshes with terminal gear 285, which receive screw 23 and which is the operating gear for the specimen tube 17. Rotation of gear 285 is facilitated by the provision of bearing 287 on bearing plate 265, and bearing 289 on plate 87. The aforementioned bearing plate 265 also has secured to it the spaced vertically extending straps 291 and 293 in which the light tube 47 is firmly mounted.

Operating power for the foregoing mechanism is supplied by motor 67, the specimen tube 17 being raised to its uppermost position by engagement of clutch gear 233 with gear 241, which transmits actuating power to actuating screw 23 as will be pointed out hereinafter in greater detail, through gear train 255, 267, 275, 283, and 285. The screw 23 terminates at its bottom end in a guide block 295, which is raised and lowered along with screw 23 and which receives through longitudinal slot 297 in the guide housing 247 the screws 299, which mount actuating bracket contact arm 301 which engages and actuates uppermost and lowermost spring limit switches 113 and 115, respectively, so that as the specimen tube is raised to its uppermost position, contact arm 301 will engage and trip top limit switch 113, causing solenoid 197 to become deactivated and drop its piston 195, thereby causing the bell crank arm 191 to move the clutch yoke 187 to the right as viewed in Fig. 3 against the force of spring 239 until beveled gear 203 engages gear 241, thereby reversing the rotation of this gear 241, the aforesaid gear train 255, 267, 275, 283, and 285, and also the rotation of screw 23 so as to move block 295 downwardly until bracket arm 301 engages the lower limit switch 115, so as to actuate this switch to stop the movement of screw 23 and to reset the solenoid 197, so that the spring 239 will push the clutch yoke 187 to the left as viewed in Fig. 3 until driving connection is established between gears 233 and 241. The end of shaft 231 is provided with a longitudinal keyway 303 which accommodates movements of the gear 233 with the clutch yoke 187. The beveled gears 203 and 233 are mounted on the clutch yoke arms 185 and 229 by means, not shown, enabling them to rotate and at the same time to shift longitudinally along the respective shafts in accordance with reverse movements of the yoke 187.

In accordance with the drawings, the specimen tube 17 may be raised at any one of three speeds, although this number may be varied if desired. As will be seen from the drawings, motor shaft 141 carries beveled gear 143 which drives the beveled gear 145 which is mounted on shaft 147 that carries the gear 149, and beveled clutch gear 203 which is slidable in key slot 193 responsively to movements of yoke arm 185. The gear 149, shaft 147, and clutch gear 203 therefore are rotated continuously. Mounted on shaft 153 are separate compound gears which are rotated independently of the shaft, each of which gears consists of a large gear and a small gear integral therewith, large gear 151 having small gear 155 integral therewith, large gear 161 having small gear 163 integral with it, and large gear 165 having small gear 167 integral with it.

Small gears 155, 163, and 167 intermesh with large gears 157, 171, and 175 on shaft 159, these large gears 157 and 171 having smaller gears 169 and 173 integral therewith, large gear 175 being a single gear, these gears being independently rotatable with respect to shaft 159. Accordingly, rotation of gear 149 on shaft 147 rotates gears 151 and 155, which rotation is transmitted through gear 155 to gear 157 and its integral gear 169, thence to gears 161 and 163, thence to gears 171 and 173, from gear 173 to gears 165, 167 and thence to gear 175.

Speed selecting means for the specimen tube comprise intermeshing gears 213 and 215, the latter being mounted on shaft 205 and slidable along shaft 205 in key slot 207, this being accomplished by manual manipulation of lever 219 of a speed selector yoke comprising the arms 209 and 211 which serve as mounting for speed-selector gear 213, which is rotatably driven by whichever gear of the series 157, 171, and 175, is selected to be the driving gear for the gear 213, rotation of the latter driving the gear 215 and shaft 205 at a speed corresponding to the speed of rotation of gear 213 as transmitted thereto by the selected gear 157, 171, or 175 with which gear 213 is intermeshed.

The shaft 205 which is driven by gear 215 of the speed selector means is connected by coupling 219' to shaft 221 which, therefore, is rotated at the same speed as is shaft 205 and which has spur gear 227 mounted thereon adjacent to its outer end. This spur gear 227 meshes and drives spur gear 237 on shaft 231 which drives the gear 233 and therefore gear 241 at a speed corresponding to the selected speed of rotation of gear 213, which in turn is dependent upon the rotary speed of whichever of the selected gear the gear 213 is intermeshed, as set forth above, so that the specimen tube 17 may be raised at any one of the selected three speeds until the upper limit switch 113 is tripped by bracket 301.

This action de-energizes the solenoid 197, such shifting the bell crank lever 191 to engage continuously operating reverse gear 203 with gear 241 to lower the specimen tube 17 in a speed corresponding to the speed of rotation of gear 203, the turbidity of successive zones of the specimen determining the selected speed or speeds of advancement of specimen tube 17, to which turbidities the width of the light-transmitting slit 25 may be adjusted, together with the resultant output of the photoelectric cell for producing a chart or graph corresponding to that designated by C on Fig. 1, which chart or graph may be interpreted by a scale E on recorder D.

It has been stated that the specimen in the tube 17 is to be scanner by a beam of light of constant intensity emanating through slit 25. In order to ensure the scanning light being of constant intensity, the light source 55 and also motor 67 for that matter to produce a constant speed, there are provided the voltage stabilizer 70, a step-down transformer 303, and the variable resistance 71.

The foregoing is a description of a typical embodiment of the instant invention, it being understood that many structural details may be modified in accordance with operative conditions without departing from the inventive concept, and accordingly, it will be understood that it is intended and desired to embody within the scope of the invention such modifications and changes as may be necessary or desirable to adapt the invention to varying conditions and uses as defined by the appended claims.

I claim:

1. A turbidimeter for measuring and indicating turbidities in a specimen exhibiting successive zones of varying turbidities and retained in a tubular columnar and light-transmitting container, which comprises, in combination, means for directing a continuous beam of light from a constant source of light through the specimen, so that the beam of light continuously scans the specimen, mechanism for dimensionally adjusting the beam of light, light-responsive means actuated by light transmitted through the specimen, means actuated by electrical output from the light-responsive means for rendering visible the said output responsively to densities of zones of turbidity in the specimen being secured, mechanism for scanningly actuating the specimen column at a selected one of several scanning speeds, the said mechanism comprising a motor, gear-train means actuated by the motor, speed-selector means engaging the gear train means and driving mechanism interconnecting the speed-selector means and the specimen column for reversing direction of travel of the specimen column responsive to predetermined distance of travel of the column through the scanning light, the gear train means actuated by the motor including a first gear-train shaft continuously driven by the motor, a series of gears on the first shaft, the gears being independent of each other and rotatable independently with respect to the shaft, a second gear-train shaft adjacent to the first shaft and parallel thereto, a series of gears on the second shaft and independently rotatable with respect to the shaft, each gear on the first shaft intermeshing with a corresponding gear on the second gear-train shaft, the speed-selector means including a manually shiftable yoke having a pair of intermeshing gears mounted between spaced parallel arms extending from a manually operable lever, one of the pair of gears of the speed-selector means being an inner gear and the other gear of the pair being an outer gear, the inner gear of the pair being engageable with a selected gear of the second gear-train shaft and operable thereby for driving the outer gear, a power-transmitting shaft mounted in the outer gear extending parallel to the first and second gear-train shafts and provided with a key slot enabling selective positioning of the selector means on a gear on the second gear-train shaft, thereby rotating both gears of the speed-selector means together with the power-transmitting shaft in the outer gear of the speed-selector means, a second shaft parallel to the power-transmitting shaft and adjacent thereto, a power-transmitting spur gear adjacent to an outer end of the second shaft and meshing with an adjacent spur gear on said first gear-train shaft, a beveled gear on the second shaft, a beveled gear on the first gear-train shaft adjacent to an outer free end thereof, reversible clutch means including the oppositely beveled gears and having a top beveled gear operable selectively with the said oppositely beveled gears, a gear-train leading from the top beveled gear to the specimen tube for actuating the specimen tube for raising and lowering the tube, selectively, responsively to whichever of the beveled gears the top beveled gear meshes, means for shifting the clutch and means operable by cycles of operation of the specimen tube for controlling operation of the latter.

2. A turbidimeter for measuring turbidities in a specimen exhibiting successive zones of varying turbididites and retained in a movable tubular columnar container which comprises motor-driven mechanism for moving the columnar specimen-containing tubular container through a scanning collimated beam of light of constant intensity, the said mechanism including a motor, a driving shaft continuously driven by the motor, a spur gear on the shaft, a first driven shaft mounted parallel to the driving shaft and having a gear train thereon composed of a series of compound gears, each of which is independent of the remainder and independently rotatable with respect to the first driven shaft, each compound gear having a larger gear section and a smaller gear section integral therewith, the spur gear on the driving shaft meshing with the larger gear section of the first gear of the gear train on the first driven shaft, a second driven shaft mounted parallel to the first driven shaft and also having thereon a gear train comprising a series of compound gears thereon having a larger section and a smaller section integral therewith, each compound gear being rotatable independently with respect to the remaining compound gears and with respect to the second shaft, the compound gears on the second shaft being larger than corresponding compound gears on the first driven shaft and having a larger section of each compound gear intermeshing with a smaller section of a corresponding compound gear on the first driven shaft so that a compound gear on one of the driven shafts is driven by a compound gear on the other of the driven shafts and contrarily, all of the said gears being driven continuously by the spur gear on the driving shaft, and speed-selector means for the specimen container including a first gear, a second gear intermeshing with the first gear, a power-transmitting shaft carried by the second gear and manually operable lever means for engaging the first gear with a selected gear on the aforesaid second driven shaft for actuating the power-transmitting shaft at a selected one of a plurality of possible speeds.

3. A turbidimeter as claimed in claim 2 wherein the power-transmitting shaft terminates in a spur gear, a further shaft mounted parallel to the power-transmitting shaft, a second spur gear on an end of the further shaft intermeshing with the spur gear on the power-transmitting shaft, a beveled gear on an opposite end of the further shaft, clutch mechanism including an upper beveled gear selectively engageable with the beveled gear on the further shaft, a gear train actuatable at a selected speed responsively to engagement of the upper beveled gear with the beveled gear on the said further shaft, and means interconnecting the columnar specimen holder with the gear train for advancing the columnar specimen holder at the selected speed of the gear train.

4. A turbidimeter as claimed in claim 2, wherein the driving shaft terminates in a beveled gear, a clutch yoke including the beveled gear on the driving shaft and the beveled gear on the further shaft, an upper beveled gear for driving the gear train interconnected with the columnar specimen holder, the beveled gear on the driving shaft rotating oppositely to the beveled gear on the further shaft, the latter beveled gear being driven at a selected speed for advancing the columnar specimen holder at the selected speed, and means for shifting the clutch yoke responsively to maximum advance of the specimen holder to engage the beveled gear on the driving shaft with the upper beveled gear for retracting the specimen holder at conclusion of the maximum advance thereof.

5. A turbidimeter as claimed in claim 4, wherein the specimen holder is mounted on an actuating screw adapted to advance and to retract the specimen holder responsively to selected operation of the gear train on the clutch yoke, a terminal block for the actuating screw movable therewith in accordance with movements of the specimen holder and screw, limit switches for terminating selected maximum advance and retraction of the specimen holder, actuating means for the limit switches carried by the block, and solenoid-actuated mechanism acting on the clutch yoke for reversibly shifting the clutch yoke responsively to selected actuation of the limit switches.

References Cited in the file of this patent

UNITED STATES PATENTS

| | | |
|---|---|---|
| 2,104,525 | Proskouriakoff | Jan. 4, 1938 |
| 2,379,158 | Kalischer | June 26, 1945 |

FOREIGN PATENTS

| | | |
|---|---|---|
| 938,937 | Germany | Feb. 9, 1956 |